United States Patent [19]

Iyengar et al.

[11] 4,149,772
[45] Apr. 17, 1979

[54] OPTICAL FIBRE HAVING LOW MODE DISPERSION

[75] Inventors: Rama Iyengar, Dollard des Ormeaux; Felix P. Kapron, Richmond, both of Canada

[73] Assignee: Northern Electric Company Limited, Montreal, Canada

[21] Appl. No.: 855,408

[22] Filed: Nov. 28, 1977

Related U.S. Application Data

[63] Continuation of Ser. No. 615,223, Sep. 22, 1975, abandoned.

[51] Int. Cl.² ............................................. G02B 5/14
[52] U.S. Cl. ................................................. 350/96.33
[58] Field of Search ............... 350/96.33, 96.29, 96.30

[56] References Cited

U.S. PATENT DOCUMENTS

| 3,157,726 | 12/1964 | Hicks, Jr. et al. | 350/96.30 |
| 4,000,416 | 12/1976 | Goell | 350/96.33 |

*Primary Examiner*—John K. Corbin
*Assistant Examiner*—Stewart Levy
*Attorney, Agent, or Firm*—Sidney T. Jelly

[57] ABSTRACT

An optical fibre has a core and a plurality of rings surrounding the core. In one arrangement the core and subsequent alternate rings are light transmitting, while the intermediate rings are of cladding material. In an alternative arrangement the core and alternate rings are of cladding material and intermediate rings are light transmitting. The light transmitting rings can be of varying refractive index or of constant refractive index.

7 Claims, 11 Drawing Figures

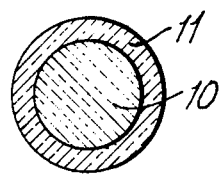
Fig-1-
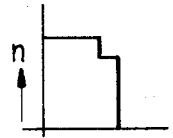
Fig-2-
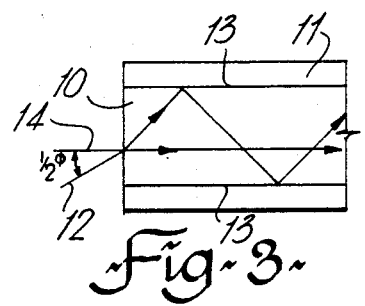
Fig-3-
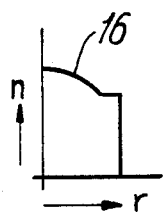
Fig-4-
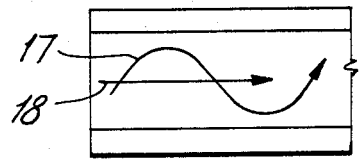
Fig-5-
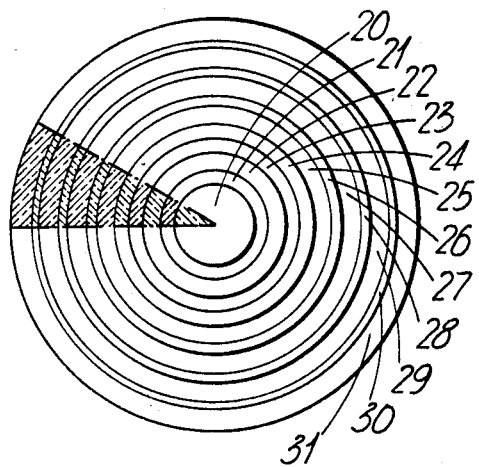
Fig-6-
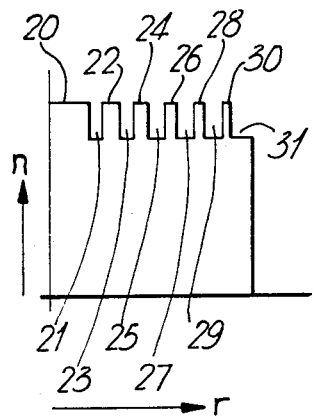
Fig-7-

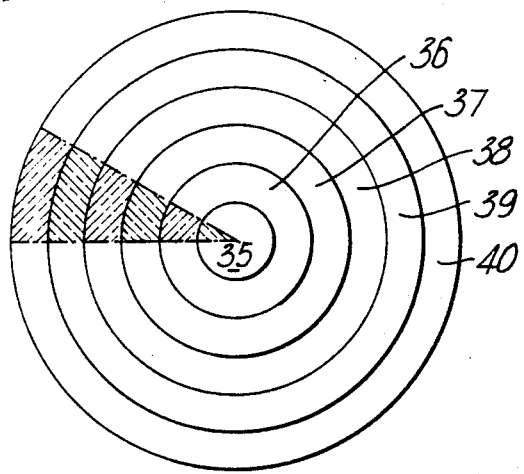
Fig-8-
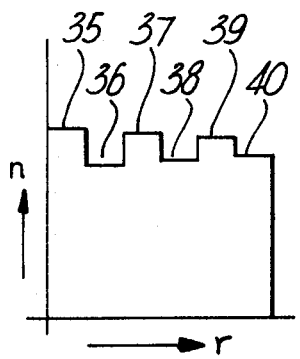
Fig-9-
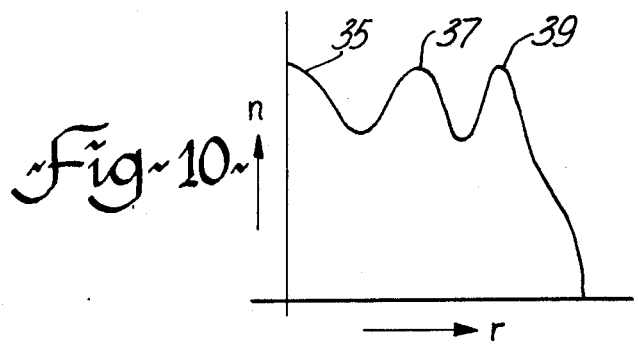
Fig-10-
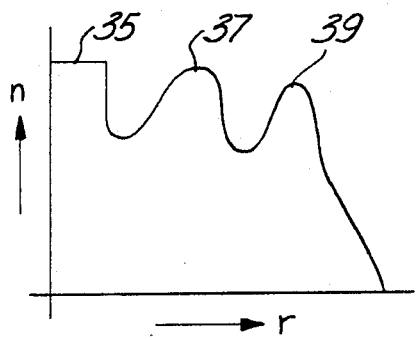
Fig-11-

OPTICAL FIBRE HAVING LOW MODE DISPERSION

This application is a Continuation of application Ser. No. 615,223, filed Sept. 22, 1975.

This invention relates to optical fibres having low mode dispersion, particularly as used for communications systems.

An optical fibre conveys, or transmits, light from an input end to an output end by the phenomenon of internal reflection. A fibre generally comprises a core surrounded by a cladding and the light is retained within the core by the internal reflection.

One of the faults of conventional optical fibres is "mode dispersion," which causes pulse spreading. Differential mode delay can be eliminated if a fibre is allowed to propagate only a single fundamental mode. However this requires the fibre to have a small core diameter, making fibre splicing and connecting difficult. Also, single-mode lasing sources are required for efficient light insertion into such a single-mode fibre. The diameter of the core cannot be arbitrarily increased by reducing the numerical aperture as too small a numerical aperture requires a thick cladding for containment of the evanescent wave and also too large a radius of curvature for low bending losses.

The present invention provides an optical fibre having a cross-section area which enables efficient coupling and a fairly large numerical aperture and which substantially eliminates mode dispersion. An optical fibre, in accordance with the present invention, in addition to a light transmitting core, also has one or more rings around the core—each transmitting light, with a ring of "cladding" material, that is material having a refractory index lower than the light transmitting material on each side thereof. An alternative arrangement has a core of "cladding" material with alternate rings also of "cladding" material, with the intermediate rings light transmitting.

The invention will be readily understood by the following description of certain embodiments, by way of example, in conjunction with the accompanying diagrammatic drawings, in which:

FIG. 1 is a cross-section through one known form of optical fibre having a stepped refractory index;

FIG. 2 illustrates the form of the refractive index curve for the fibre of FIG. 1;

FIG. 3 is a longitudinal cross-section of a fibre of the form of FIG. 1, illustrating light ray propagation therein;

FIG. 4 is a curve illustrating the refractive index characteristic of another known form of optical fibre;

FIG. 5 is a longitudinal cross-section of the known form of fibre, the refractive index characteristic of which is illustrated in FIG. 4;

FIG. 6 is a cross-section through a further form of optical fibre in accordance with the present invention;

FIG. 7 is a curve illustrating the refractive index characteristic of the fibre of FIG. 6;

FIG. 8 is a cross-section through yet a further form of optical fibre in accordance with the present invention;

FIG. 9 is a curve illustrating the refractive index characteristic of the fibre of FIG. 8;

FIGS. 10 and 11 are curves illustrating the refractive index characteristics of two further forms of optical fibre in accordance with the present invention.

As previously stated, an optical fibre conveys, or transmits, light from an input end to an output end by the phenomenon of internal reflection. One form of optical fibre has a core 10 and a cladding 11, as illustrated in FIG. 1, with the core 10 having one refractive index and the cladding 11 a lower refractive index—as seen in FIG. 2. Waveguiding occurs via internal reflection for all light rays launched within the full cone angle $\phi$ as illustrated in FIG. 3. The cone angle $\phi$ is given by the numerical aperture (NA):

$$NA = \sin \phi/2 = \sqrt{n^2 - n^2(1-\Delta)^2} \approx n\sqrt{2\Delta},$$

where n is the refractive index of the core 10 and $n(1-\Delta)$ is the refractive index of the cladding 11.

Typically, for low loss guides, $\Delta \approx \frac{1}{2}\%$ to 4%, $NA \approx 0.15$ to 0.42 and $\phi \approx 17°$ to 50°. The core diameter D, NA, and cladding thickness T, all determine the nature of modes propagating along the fibre. Thus, for example, a light ray 12 launched at a large angle to the fibre axis (near the critical angle $\phi/2$) will experience a large number of reflections at the core/cladding interface 13, compared to a light ray 14 entering at a shallower angle. At the end of a length L of fibre the time delay difference between these highest and lowest order modes is:

$$\tau_s = (L/c)n\Delta \approx 50\Delta \text{ns/km},$$

where c is the vacuum light velocity, $\Delta$ being in %.

This differential mode delay is termed mode dispersion and causes pulse spreading even with monochromatic light. The frequency—length product bandwidth of the step-index fibre is thus limited at about 5 to 40 MHz-km.

Differential mode dispersion is eliminated if the fibre is allowed to propagate only the single fundamental ($HE_{11}$) mode. At a wavelength $\lambda$ this occurs if the "V-value" of the guide satifies $$V = \pi(D/\lambda) \cdot NA < 2.405.$$

In single mode operation, the fibre's information capacity is limited essentially by chromatic material dispersion (about 0.8 to 1 ns/km per 100 Å of source spectral width in the GaAlAs range of 8000 to 8600Å). However this requires D, the core diameter, to be approximately equal to 1–5 $\mu$m. This is a small core cross-section and makes splicing and connecting difficult. As previously stated, single-mode lasing sources are required for efficient light insertion into such a single-mode fibre. The diameter D cannot be arbitrarily increased by reducing the NA, since too small an NA requires too thick a cladding for containment of the evanescent wave and too large a radius of curvature for low bending losses.

An alternative form of optical fibre has a core with a non-uniform refractive index. This is illustrated in FIGS. 4 and 5, FIG. 4 showing the core refractive index decreasing approximately parabolically, at 16. The cladding has a lower refractive index, as in the fibre of FIGS. 1 to 3. As seen in FIG. 5 light rays 17 follow quasi-sinusoidal paths, rather than a zig-zag one. Light travels a shorter distance in regions of high refractive index than in regions of low index in a given time and this tends to equalize the average velocities of the various rays. The time delay between highest and lowest order modes 17 and 18 respectively is $$\tau_g = K(L/c)n\Delta^2 \approx (K/2)\Delta^2 \text{ ns/km}$$

where k is a number ranging from 1/8 to about 2 depending upon the accuracy with which the profile is maintained; Δ in %.

With fibres of the non-uniform, or graded, refractive index, mode delays of ½ to 2 ns/km have been obtained. Manufacturing tolerances must be extremely tight if the theoretical limits of 1/64–1 ns/km are to be achieved. A disadvantage of graded index fibres is that they accept only half as much light from an incoherent source as do step-index fibres, and also require twice the curvature radius in bends.

In addition to the above disadvantages, graded index fibres when produced from a concentric double crucibles require a fast ion diffusion exchange on the fibre drawing step. Further, soft glasses of attenuation higher than that of fused silica are used, small cores of 30 to less than 50 μm diameter are produced, and it is difficult to attain a closely parabolic profile of the refractive index.

Graded index fibres can also be produced by chemical vapour deposition (CVD) methods, but high precision in dopant concentrations is required.

The present invention uses fibres having a "stepped" gradient for the refractive index while obtaining advantages of reduced mode dispersion. FIGS. 6 and 7 illustrate a fibre in accordance with one feature of the present invention. The fibre comprises a core 20 and a series of concentric rings or layers 21. The core 20 and each alternate ring, i.e. rings 22, 24, 26, 28 and 30 are of higher refractive index than the intervening and outer rings 21, 23, 25, 27, 29 and 31, as will be seen from FIG. 7. In the example of FIG. 6 the light is conveyed through the core 20 and rings 22, 24, 26, 28 and 30. The thickness of each light conducting ring is reduced relative to the next inner ring and the innermost ring—2-2—is of a thickness slightly less than the radius of the core 20.

All the rings 22, 24, 26, 28 and 30 have $V_r$ values defined by the equation $$V_r = 2(\pi/\lambda)\sqrt{b^2 - a^2} \cdot NA$$

where a and b are the inner and outer radii of a light transmitting ring. To ensure that all modal group velocities are approximately equal, the V and $V_r$ values of core 20 and rings 22, 24, 26, 28 and 30 should be approximately the same. Hence the diameter of the core 20 and the inner and outer radii of the light transmitting rings are such that all areas are equal. If the core/cladding index differences are held constant, that is index differences between core 20 and rings 22, 24, 26, 28 and 30 and the cladding rings 21, 23, 25, 27, 29 and 31, then the light transmitting ring thickness will decrease as radius increases. It is desirable that the thicknesses of the cladding rings 21, 23, 25, 27, 29 and 31 be large enough so that evanescent field coupling between the cores or light transmitting rings is minimized, as such coupling causes some spreading in modal velocities.

However, the efficiency of input light insertion is related to the fraction of cross-sectional area occupied by core and light transmitting rays, and therefore the cladding ring thicknesses should not be too large. As an indication, 30 to 50% of the total cross-section of a fibre is an optimum to be aimed at, for the light transmitting core and rings.

The number of light conducting rings can vary, and to some extent is controlled by the NA. A large NA, for example 0.2, reduces the number of rings, and a smaller NA—0.1—permits a larger number of rings. A small NA permits more and larger rings and a larger light source but light source must be more collimated than a small one. A larger NA requires less input light collimation and permits tighter bends. The arrangement of FIG. 6 gives a constant NA, with varying light transmitting ring thickness.

FIGS. 8 and 9 relate to an optical fibre having a light transmitting core and a plurality of light transmitting rings in which there is a varying refractive index and constant ring thickness. There is a light transmitting core 35 and light transmitting rings 37 and 39, and cladding rings 36, 38 and 40.

In both arrangements as in FIGS. 6 and 8, the core can be of "cladding" that is of the lower refractive index and succeeding alternate rings also of cladding, with intermediate rings of high refractive index. That is, in FIG. 6, the refractive index as indicated in FIG. 7 can be reversed, although an outer ring of cladding will be required.

In a further alternative, not shown, ring thicknesses and index differences are both varied suitably.

It is also possible to vary the refractive index for each ring across the ring thickness. Typical examples are shown in FIGS. 10 and 11, for an optical fibre arrangement as in FIG. 8, for example.

Multi ring optical fibres are readily produced by chemical vapour deposition (CVD), plasma deposition or flame hydrolysis, all known methods for producing optical fibres. There is a particular advantage in producing rings which have a constant refractive index across their thickness in that the doping can readily be obtained. The doping level is constant and it is a matter of doping or not doping—so far as each dopant is concerned—for either a light transmitting ring or a "cladding" ring.

For a graded refractive index it is more difficult as the doping level must be varied during the production of a ring. A typical example of a process for CVD production of an optical fibre is as follows:

A tube of fused silica is mounted for rotation about its longitudinal axis—the axis vertical. Oxygen is bubbled separately through reservoirs holding Si Cl₄ and Ge Cl₄ in liquid form, the oxygen picking up a vapour from the liquid. The oxygen and vapour from each reservoir are fed to a collecting chamber plus a direct flow of oxygen. The flows are combined and fed through the fused silica tube. The tube is rotated and a flame is traversed up and down the tube. At the heated position in the tube the gases and vapour dissociate and oxidation of the silicon and germanium occur with a resultant deposition on the wall of the tube. The deposition is in the form of a sooty deposit which is fused onto the wall of the tube in the form of a glassy layer. Several passes of the flame are made to form a particular ring. The doping level is adjusted by varying the rate of oxygen flow through the germanium chloride solution.

After the required number of rings have been formed, the tube is collapsed, again by passing the flame along the tube, but with a higher temperature so that the tube softens and collapses under surface tension forces. Thus the inner ring becomes the core. The collapsed tube is then pulled into a fibre in a conventional manner, for example by feeding into a furnace and pulling from the lower end and winding on a drum.

What is claimed is:

1. An optical fibre having a plurality of concentric, spaced, light transmission paths, each path for transmission of the same single optical mode, comprising a core and at least three rings surrounding the core, said rings and core of alternate high refractive index light transmitting material and low refractive index cladding material, relative to one another, to provide at least two concentric light transmitting paths separated by cladding material, the cross-sectional area of each light transmitting path defined by:

$$V \approx 2(\pi/\lambda)\sqrt{b^2 - a^2} \cdot NA$$

where NA=numerical aperture; a is the inner radius and b is the outer radius of the light transmitting path, $\lambda$ is the wavelength and V is less than about 2.4.

2. An optical fibre as claimed in claim 1, said core and subsequent alternate rings being of cladding material and the intermediate rings of light transmission material to provide said at least two light transmitting paths.

3. A fibre as claimed in claim 1, the cross-sectional areas of the light transmitting paths equal and the difference in refractive index between each light path and the related cladding is constant.

4. A fibre as claimed in claim 3, the refractive index of each light path different and the cross-sectional area of the light paths different.

5. An optical fibre as claimed in claim 1, said core and subsequent alternate rings comprising said light transmission paths, the intermediate rings of cladding material.

6. An optical fibre as claimed in claim 5, the core and each light transmitting ring having a reducing radial thickness and a substantially constant relatively higher refractive index.

7. An optical fibre as claimed in claim 5, the core and each light transmitting ring of the same radial thickness, the refractive index of the core and light transmitting rings reducing stepwise.